United States Patent
Chaudhuri et al.

(10) Patent No.: US 11,865,942 B2
(45) Date of Patent: Jan. 9, 2024

(54) ELECTRICAL VEHICLE CHARGING STATION WITH POWER MANAGEMENT

(71) Applicant: GREEN MOTION SA, Le Mont-sur-Lausanne (CH)

(72) Inventors: Toufann Chaudhuri, Morges (CH); Yann Cuenin, Saint-Martin (CH); Martin Veenstra, Lausanne (CH)

(73) Assignee: Eaton Intelligent Power Limited, Dublin (IE)

( * ) Notice: Subject to any disclaimer, the term of this patent is extended or adjusted under 35 U.S.C. 154(b) by 47 days.

(21) Appl. No.: 17/426,572

(22) PCT Filed: Jan. 30, 2020

(86) PCT No.: PCT/IB2020/050728
§ 371 (c)(1),
(2) Date: Jul. 28, 2021

(87) PCT Pub. No.: WO2020/157688
PCT Pub. Date: Aug. 6, 2020

(65) Prior Publication Data
US 2022/0105820 A1    Apr. 7, 2022

(30) Foreign Application Priority Data
Jan. 30, 2019   (EP) ..................... 19154539

(51) Int. Cl.
*B60L 53/63*    (2019.01)
*B60L 53/54*    (2019.01)
(Continued)

(52) U.S. Cl.
CPC ............... *B60L 53/63* (2019.02); *B60L 53/51* (2019.02); *B60L 53/53* (2019.02); *B60L 53/54* (2019.02);
(Continued)

(58) Field of Classification Search
CPC .......... B60L 55/00; B60L 53/51; B60L 53/53; B60L 53/54; B60L 53/62; B60L 53/665;
(Continued)

(56) References Cited

U.S. PATENT DOCUMENTS 7,889,524 B2 * 2/2011 Lee .................. B60L 53/24
363/124
8,143,856 B2 * 3/2012 Andrea ................. H02M 7/797
320/109

(Continued)

FOREIGN PATENT DOCUMENTS

AU   2014218477 A1   9/2014
CA     2672422        6/2008
(Continued)

OTHER PUBLICATIONS

International Search Report for PCT/IB2020/050728, dated May 8, 2020, 4 pages.
(Continued)

*Primary Examiner* — Naum Levin
(74) *Attorney, Agent, or Firm* — Nixon & Vanderhye P.C.

(57) ABSTRACT

The invention concerns an electrical vehicle charging station for at least one electric vehicle in a network including at least a house, energy producers, and energy consumers.

24 Claims, 3 Drawing Sheets

(51) Int. Cl.
*B60L 53/51* (2019.01)
*B60L 53/53* (2019.01)
*B60L 53/62* (2019.01)
*B60L 53/66* (2019.01)
*B60L 55/00* (2019.01)

(52) U.S. Cl.
CPC ............ *B60L 53/62* (2019.02); *B60L 53/665* (2019.02); *B60L 55/00* (2019.02)

(58) Field of Classification Search
CPC .......... B60L 53/63; Y02T 90/12; Y02T 90/16; Y02T 90/167; Y04S 10/126
See application file for complete search history.

(56) References Cited

U.S. PATENT DOCUMENTS

| | | | | |
|---|---|---|---|---|
| 8,872,379 | B2 * | 10/2014 | Ruiz | B60L 1/003 |
| | | | | 307/66 |
| 9,263,968 | B2 * | 2/2016 | Potts | H02J 50/70 |
| 10,875,406 | B2 * | 12/2020 | Galin | B60L 53/14 |
| 11,031,818 | B2 * | 6/2021 | Danilovic | H02J 50/12 |
| 11,124,080 | B2 * | 9/2021 | Donnelly | H02J 50/10 |
| 11,165,254 | B2 * | 11/2021 | Bhowmik | H02J 7/35 |
| 11,192,465 | B2 * | 12/2021 | Brombach | H02J 3/18 |
| 11,267,358 | B2 * | 3/2022 | Smolenaers | B60L 53/66 |
| 11,491,883 | B2 * | 11/2022 | Khaligh | B60L 53/22 |
| 2009/0177580 | A1 | 7/2009 | Lowenthal et al. | |
| 2010/0017045 | A1 | 1/2010 | Nesler et al. | |
| 2011/0204720 | A1 | 8/2011 | Ruiz et al. | |
| 2011/0276194 | A1 * | 11/2011 | Emalfarb | B60L 53/66 |
| | | | | 700/297 |
| 2014/0203077 | A1 * | 7/2014 | Gadh | B60L 53/30 |
| | | | | 235/382 |
| 2018/0001781 | A1 | 1/2018 | Quattrini, Jr. et al. | |
| 2018/0215276 | A1 | 8/2018 | Lowenthal et al. | |
| 2018/0278181 | A1 * | 9/2018 | Afridi | H02M 1/4233 |
| 2020/0031238 | A1 * | 1/2020 | Kydd | H02J 9/062 |

FOREIGN PATENT DOCUMENTS

| | | | | | |
|---|---|---|---|---|---|
| CN | 102025182 | A | * | 4/2011 | |
| CN | 106233563 | A | * | 12/2016 | ............ B60L 53/305 |
| CN | 106960279 | A | * | 7/2017 | ............ G06Q 10/067 |
| CN | 108876040 | A | * | 11/2018 | ............ G06Q 10/04 |
| CN | 109050284 | A | * | 12/2018 | ............ G06Q 10/04 |
| CN | 107154625 | B | * | 10/2019 | ............ G06Q 10/063 |
| EP | 2 367 255 | | | 9/2011 | |
| WO | WO-2015178158 | A1 | * | 11/2015 | ............ B60L 11/18 |
| WO | 2017/205690 | A1 | | 11/2017 | |
| WO | WO-2019071154 | A1 | * | 4/2019 | ............ B60L 53/00 |

OTHER PUBLICATIONS

Written Opinion of the ISA for PCT/IB2020/050728, dated May 8, 2020, 7 pages.

* cited by examiner

ELECTRICAL VEHICLE CHARGING STATION WITH POWER MANAGEMENT

CROSS REFERENCE TO RELATED APPLICATIONS

The present application is the U.S. national phase of International Application No. PCT/IB2020/050728 filed 30 Jan. 2020, which designated the U.S. and also claims priority to the earlier European patent application EP19154539.1 filed on Jan. 30, 2019 the entire contents of each of which are hereby incorporated by reference.

TECHNICAL FIELD

The present invention concerns the field of smart houses with a network of devices, such as electrical devices, which may be energy consumers or producers and which are interconnected in such an environment.

BACKGROUND ART

FIG. 1 illustrates a schematical configuration of a smart house connected to different electrical power producers/sources and consumers. Here, in this configuration, the house forms the centre of a local network ("LN") and all the power sources and other consumers are connected to the house.

More specifically, as a non-limiting example, FIG. 1 features a house 1 in a local network LN of electrical systems, such as electrical producers/sources and consumers. Represented in FIG. 1, as examples, are a main power source 2 (such as the grid), local energy production means 3 (such as photovoltaic panels), energy storage means for example batteries 4, and energy consumers such as a heat pump 5 and an electrical vehicle charging station 6 ("EVCS").

Accordingly, a modern smart house 1 as exemplarily illustrated in FIG. 1 comprises a number of power producers/sources 2-4 and power consumers 1, 5, 6, some of which sources and consumers have a certain capability to communicate and others not. Currently there is still no common standard for all such devices to communicate together and to decide which devices shall consume the available power in priority at a given point in time.

The use of smart meters is a way to solve the issue, but it requires to install a large number of these meters and setup communication between meters and apparatuses—which must be done using the proprietary protocols offered by the different smart meter companies.

Adding an electric vehicle charging station 6 in such as network does not make it more complicated in principle, but for the EVCS manufacturer, this means that the unit must be programmed with all the existing protocols if the intention is to communicate with any existing smart meter. This can be costly and requires a large maintenance effort if it is at all possible.

Additionally, in older houses, installing smart meters will have a certain cost and the return on investment is not always guaranteed. Also other adaptations of hardware and software may be necessary to allow connection and communication between all devices of the local network.

For houses that are not all equipped with smart apparatuses, there is currently no simple way to define what power shall be used for charging the electrical vehicle 7 and how the energy may be properly and economically managed in the local network.

It gets even more complicated when the house is equipped with power production means and sources, for example photovoltaic panels 3. The user usually would like to define how to use the additional source of energy in the smartest possible way, but cannot define in a simple way how much power to use for charging an electrical vehicle 7 ("EV") as this depends on instant production and consumption data of the entire house 1, consumers and local network.

Publication AU 2014218477 (corresponding to US 2009/0177580) discloses a network-controlled charging system for electrical vehicles. As stated in detail in this prior art, electric vehicles can be recharged from a local electricity grid. These vehicles can also be a source of electric power to be transferred to the local electricity grid. The transfer of electricity stored in electric vehicles to the local electric grid is referred to as vehicle-to-grid ("V2G") and V2G is particularly attractive for electric vehicles which have their own charging devices, such as battery electric vehicles with regenerative braking and plug-in hybrid vehicles. V2G is desirable for peak load leveling—helping to meet the demand for electricity when demand is at its highest. V2G is not widely available—it is principally being used in small pilot schemes. There is a need for more widely available Demand Response and V2G to assist with peak load levelling. To this effect, this prior art proposes a system for network-controlled charging of electric vehicles and the network-controlled electrical outlets used in this system are described. The system comprises electrical outlets, called Smartlets™, which may be networked as follows: Smartlets™ and electric vehicle operators communicate via wireless communication links; Smartlets™ are connected by a LAN to a data control unit; and the data control unit is connected to a server via a WAN. The server may store: consumer profiles (including account information for payment); utility company power grid load data (updated in real time by the utility company); electricity consumption data that may be required for government tax purposes; and tax rate information received from tax authorities to allow an electric vehicle power consumption tax to be calculated. The system may be vehicle-to-grid enabled. The system of the invention may be used to assist in collecting a tax on electricity consumption by electric vehicles—the Smartlet™ system provides accurate measurement and reporting of electricity consumed by electric vehicles.

Publication WO 2017/205690 (corresponding to US 2018/0001781) discloses a method for dynamic allocation of power modules for charging electric vehicles. Specifically, the disclosed charging system includes multiple dispensers that each include one or more power modules that can supply power to any one of the dispensers at a time. A dispenser includes a first power bus that is switchably connected to one or more local power modules and switchably connected to one or more power modules located remotely in another dispenser. The one or more local power modules are switchably connected to a second power bus in the other dispenser. The dispenser includes a control unit that is to cause the local power modules and the remote power modules to switchably connect and disconnect from the first power bus to dynamically allocate the power modules between the dispenser and the other dispenser.

Publication US 2018/0215276 discloses an electric vehicle charging station that is installed in a residence. More specifically, this prior art discloses a method and apparatus for an electrical vehicle charging system with electrical load management. In one embodiment of the invention, the electrical vehicle charging system includes a charging station that is installed in a residence that is used to charge electric vehicles and a number of current monitors that monitor current being drawn through electrical circuits of the residence. The charging station is coupled with a set of one or more service drop power lines through a main circuit breaker in an electrical service panel of the residence. The service drop power line(s) provide electricity from a power grid to the residence including the charging station. The charging station receives energy readings from the current monitors where each energy reading indicates that some amount of current is being drawn on the set of service drop power lines separate and apart from any current being drawn by an electric vehicle through the charging station. The charging station controls the amount of current that can be drawn by an electric vehicle through the charging station based on the received energy readings to avoid exceeding the electrical capacity of the residence and tripping the main circuit breaker.

Publication US 2011/0204720 discloses an efficient usage, storage and sharing of energy in buildings, vehicles and equipment. On a general level, this publication mentions energy sources and storage systems for energy sharing between buildings, vehicles, equipment and the grid and numerous different embodiments to this effect. This document corresponds to the configuration of FIG. 1 discussed above in the background art section where typically the house is at the centre of the system and the disadvantages of such configuration are also discussed above. This prior art does not address the problems underlying the present invention.

The disclosed systems and methods however do not solve the above-mentioned problems of communication and energy distribution in a simple and effective way with a proper consideration of the limits of the elements present in the system.

SUMMARY OF THE INVENTION

An aim of the present invention in therefore to improve the known systems and methods.

A further aim of the present invention is to propose a system that can be easily used or added in an existing local network configuration (for example as illustrated in FIG. 1).

A further aim of the present invention is to propose a system and method whereby the elements are connected in a simple and efficient way.

A further aim of the present invention is to propose a system and method whereby energy is managed in a cost effective and efficient way avoiding unnecessary production and loss.

A further aim of the present invention is to use and integrate the technology progress in existing networks.

These aims and others are achieved by the systems and methods described in the present application and defined inter alia in the claims.

Accordingly, in an embodiment, the invention concerns an electrical vehicle charging station (EVCS), as described herein, for at least one electric vehicle (EV) in a network comprising at least a house and energy producers and energy consumers. The EVCS comprises preferably one single point of connection to the power grid of a house and the capability to supply power to and draw power from the EV and from other sources/producers and/or consumers of a network, it further comprises a computational device to process information (for example a computer) and a connectivity solution to send and receive data to/from (i.e. exchange data with) at least one end user and/or at least one server (distant or not).

In some embodiments, the EVCS comprises at least one additional source of energy attached directly to the EVCS. The additional source may be solar energy (via solar panels) or energy storage means or another equivalent source/storage.

The EVCS is preferably connected to a power metering device which measures the power at the main power inlet of the house. Hence, the EVCS may receive via the connectivity solution a value that indicates the maximum allowed power consumed from the grid through the main power inlet of the house.

This information allows the EVCS to evaluate (for example permanently or at set regular or irregular times) whether the house is capable to handle the power drawn from the grid or not for the needs of the local network. This result is not disclosed in the prior art, for example in US 2011/0204720 cited above, and is a fundamentally different approach.

In some embodiments, the EVCS also receives via the connectivity solution a value that indicates the maximum allowed power injected to the grid through the main power inlet of the house. In this embodiment, the EVCS uses the elements of the local network as sources of energy and determines how much energy may be fed to the grid. This depends on the capabilities of the house and also the energy present in the sources/producers of the network.

Then the computation device of the EVCS preferably controls the power supplied to and drawn from the vehicle, considering the power from the at least one additional source of energy, to avoid exceeding the limits for power consumption and injection in the network. The limits values may be for example the current limit depending on the capacity (e.g. physical) of the connections, or a power limit defined at a certain moment (peak shaving), or a power limit depending on price limit (cost optimization), or a current value aiming to zero (self-consumption).

In some embodiments, the EVCS contains means for converting the power from the at least one additional source of energy to a power that can be used directly in the vehicle and/or in the network and/or in the house. Typically and for example, a converter is needed to transform the solar energy to be usable in the network or in the house.

Preferably, the means for converting the power from the at least one additional source of energy is a power converter using actively switched devices. The actively switched devices may be, but not limited to, IGBTs or MOSFETs, or Si or SiC or GaN devices.

In some embodiments, at least one additional source of energy is supplying to a local DC bus contained within the EVCS.

Preferably, in embodiments of the present invention, the EVCS is of DC type.

Preferably, in embodiments of the present invention, the EVCS has a galvanic isolation.

In some embodiments of the present invention the EVCS receives via the connectivity solution a value that indicates a power factor value to be reached.

In embodiments of the present invention, the additional sources of energy comprise, but are not limited to, photovoltaic panels, batteries, compressed air storage systems, fuel cells or a combination of a source of energy with energy storage capabilities etc as described herein. Other equivalent sources are also possible.

In some embodiments of the present invention, an additional energy storage power source is directly integrated within the EVCS enclosure/case.

Preferably, in embodiments of the present invention, limit values (for example as defined hereabove) received by the EVCS via the connectivity solution are, but not limited to, manual setting by end user, automatic setting depending on time of day stored in a lookup table, as non-limiting examples.

In embodiments of the present invention, the EVCS is additionally connected to a service providing dynamic energy prices to be used in the system as will be described herein.

Preferably, in embodiments of the present invention, the EVCS controls the power supplied to and drawn from the EV, considering a maximum price of purchase of energy from the grid and a minimum price of sales of energy to the grid.

In embodiments of the present invention, the EVCS controls the power supplied to and drawn from an at least one additional source of energy with energy storage capabilities.

In embodiments of the present invention, the EVCS controls the power supplied to and drawn from the EV, optimising the energy purchase cost and sales benefit by dynamically adapting power consumption from and injection to the grid depending on price of purchase and price of sale of grid energy.

The present invention also concerns a system comprising a network with at least a house, energy producers and energy consumers and the system comprises at least one charging station as defined herein.

Charging stations, systems and methods according to embodiments of the present invention are further defined by the appended claims and by non-limiting illustrative figures.

As will be readily understood from the present description, the invention encompasses devices, systems and also methods to manage energy in a network taking different criteria in account.

DETAILED DESCRIPTION

Figure 1:
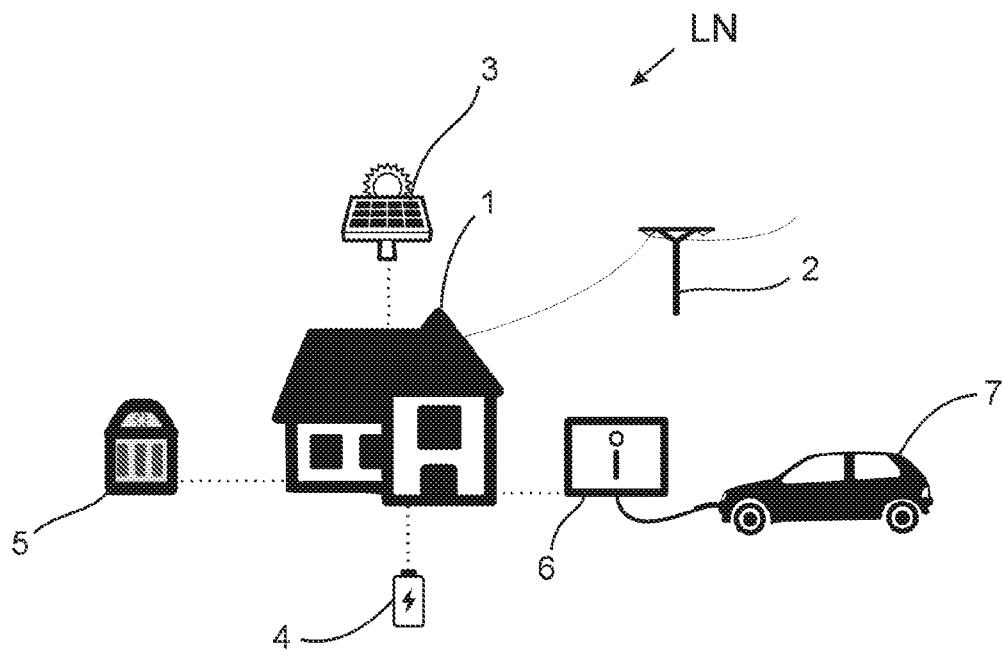
FIG. 1 illustrates a house in a network of electrical devices and systems (producers and consumers) according to the prior art.

The configuration of FIG. 1 is the one discussed in the background art of the present application. As detailed above, the local network ("LN") comprises in its centre a house 1 to which all energy consumers and producers/sources are connected, for example in a "star-shaped" configuration.

As discussed above as well, this configuration is problematic for the reasons exposed, for example the fact that the house is usually not a smart house and many adaptations are necessary for this configuration to work in a proper and efficient way with all the connected devices and elements, and the technology changes involved.

Figure 2:
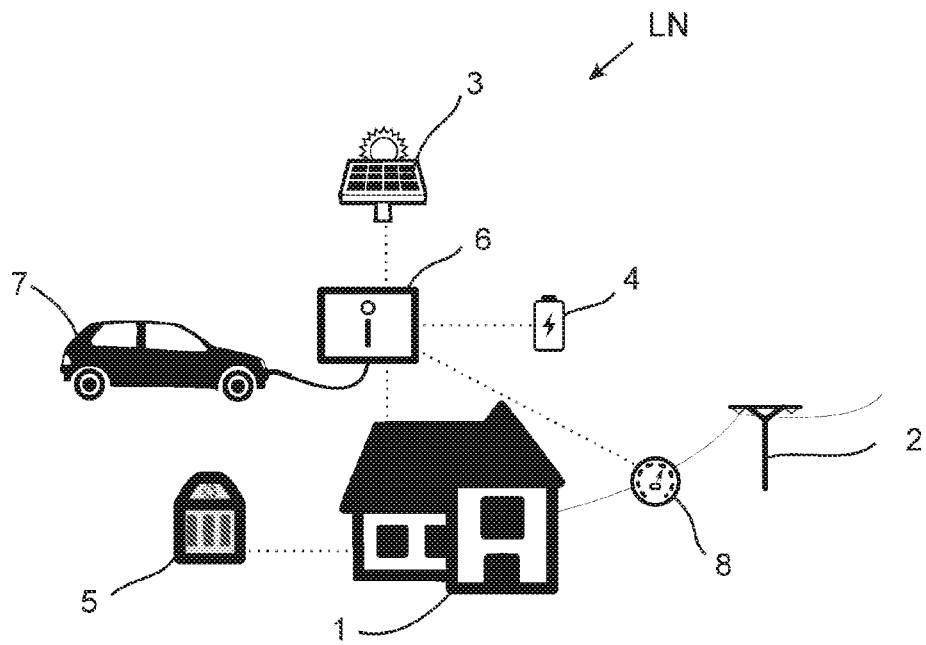
FIG. 2 illustrates an embodiment of the principle of the present invention.

The present invention and its embodiments are now discussed with reference to FIGS. 2 to 4.

In embodiments according to the present invention, the proposed solution offers a convenient way to avoid the identified problems by allowing the charging station ("EVCS") 6 to become the centre of the local network and to be the element that manages said network. It is possible to add such a functionality with appropriate capabilities in these stations 6 rather than using them as a peripheral component of the network as in FIG. 1. Contrarily to the prior art, for example US 2011/0204720, in the present invention all the power sources are connected to the EVCS 6 and not to the residential power distribution system and managed by said EVCS. The EVCS 6 forms a power hub for all the energy/power sources and manages the distribution of energy/power, for example towards the residential power distribution system (e.g. of the house).

According to embodiments, the EVCS 6 is connected directly to the power source(s)/producer(s) 2-4 and consumers 1, 5 and manages them (see FIG. 4): therefore to know what the available power is, for example from the sources of the local network (such as solar cells 3, storage 4) and from the grid 2, what the needed power is in the local network and to operate consequently for an efficient and cost effective distribution of energy (in the role of a consumer and/or of a source/producer).

In some aspects and embodiments, the invention relates to an electric vehicle charging station 6 for charging and/or discharging the car 7 battery, which has the additional capability to connect directly to one or several additional power sources 3 (such as solar panels 3) and/or energy storage 4 in addition to the house power inlet 2 from the grid and to the consumers (such as the heat pump 5) and the house. According to the invention, the elements of the local network are in principle either a consumer, or a producer/source or both, according the way the energy is managed. Typically, the house 1 and the heat pump 5 will be energy consumers, the solar cells 3 will be an energy producer, the electrical vehicle 7, the storage 4 and the grid 2 will be either an energy producer or consumer depending on the direction of the energy flux: i.e. the EV will be a consumer when the batteries of the EV are being charged and a producer when the energy of the batteries is returned to the local network as described herein.

The charging station 6 additionally has a power meter 8 connected to the main house power inlet 2. The power meter 8 may be integrated in the station 6 or be separate from the station 6.

The charging station 6 is connected to the different sources and consumers via a connectivity solution such as a physical network (such as wires) and/or a wireless network to receive the necessary information (for example data) and send the necessary commands and/or controls to the elements of the network.

According to one aspect of the present invention, the station 6 receives data, via the connectivity solution, said data comprising inter alia information relating to the maximum power that can be consumed from the grid from the main power inlet of the house. This data/information may typically depend on the maximum power that the house 1 may accept, for example taking into account its own electrical network, fuses etc. Then, on the basis of this information and other criteria, the station 6 evaluates whether the needs of the consumers in the network are not too high with respect to this maximum power value. For example, the evaluation process or method may be based on a calculation of the instantaneous sum of powers. Depending on the result of the evaluation, the station then decides whether the grid is sufficient (and the value sufficient) to provide the necessary power and the house able to handle this power or whether other sources of energy have to be used, preferably sources of the local network. These other sources are typically the sources of the local network, such as the solar cells 3, the storage 4 and the electrical vehicle itself, as this element may also be a source of energy. Hence, electrical energy may be provided to the house by the EV as an energy source.

The station 6 decides then which source has to be used, for example, on the basis of criteria set by the user, for example a priority order between the sources, or another suitable criteria.

The proposed solution is robust to any kind of condition as the operation principle is simple and centralized.

The method is bidirectional, meaning that the charging station 6 can charge and discharge the EV battery based on the needs of the building 1 while at the same time managing the other sources and consumers of the network.

In embodiments, the price of energy provided by the grid 2 may play a role in the energy management in the network LN by the station 6. For example, when energy prices are low, it is beneficial to store as much energy as possible locally, that is in the EV battery and any power source (for example 3 and 4 in FIG. 2) with storage capabilities in the local network.

A price considered low may be either a fixed value or a range with thresholds where the quantity of energy taken from the grid depends on the price in the range, i.e. the cheaper the energy, the more is taken for storage and immediate use, if the price raises, less energy is taken, the adaptation may be linear for example or follow other rules. The values may be for example predetermined by the user and the corresponding information taken from publicly available sources (for example the internet or dedicated websites).

When prices are high, it is beneficial to draw little or no power from the grid 2 and to use preferably if not exclusively the energy stored locally, or even to return power to the grid 2 from the locally produced and/or stored energy. As for the low price determination, a high price may be a set or predetermined value or a range with thresholds defined, for example, by the user, and the quantity of returned energy may be dependent on the price.

Other parameters may be taken into consideration when managing the energy (storing or returning to the grid), for example the time of the day or the weather forecast, the year's season, the planned use of the EV, the house occupancy etc.

All this energy management is made at the level the of EVCS 6 which can use cutting edge technology and data publicly available (for example through the internet) to this effect in addition to information/values/data chosen/programmed by the user.

By using this information, the charging station 6 may determine, at every time and instant, how much power shall be charged to or discharged from the car battery or taken from other sources or storages in the network in order to limit or optimize the power at the main house inlet 2 to reach an efficient mode that is preferably cost reduced for the user.

In order to achieve the above, in addition to the features discussed above, the EVCS 6 comprises means for converting the power from the additional sources of energy to a power that can be used directly at least in the vehicle 7. Typically and for example, a converter is needed to transform the solar energy of the cells 3 to be usable in the network or in the house 1.

Preferably, the means for converting the power comprise a power converter using actively switched devices. The actively switched devices may be IGBTs or MOSFETs, or Si or SiC or GaN devices. Of course, these are non-limiting examples.

Figure 3:
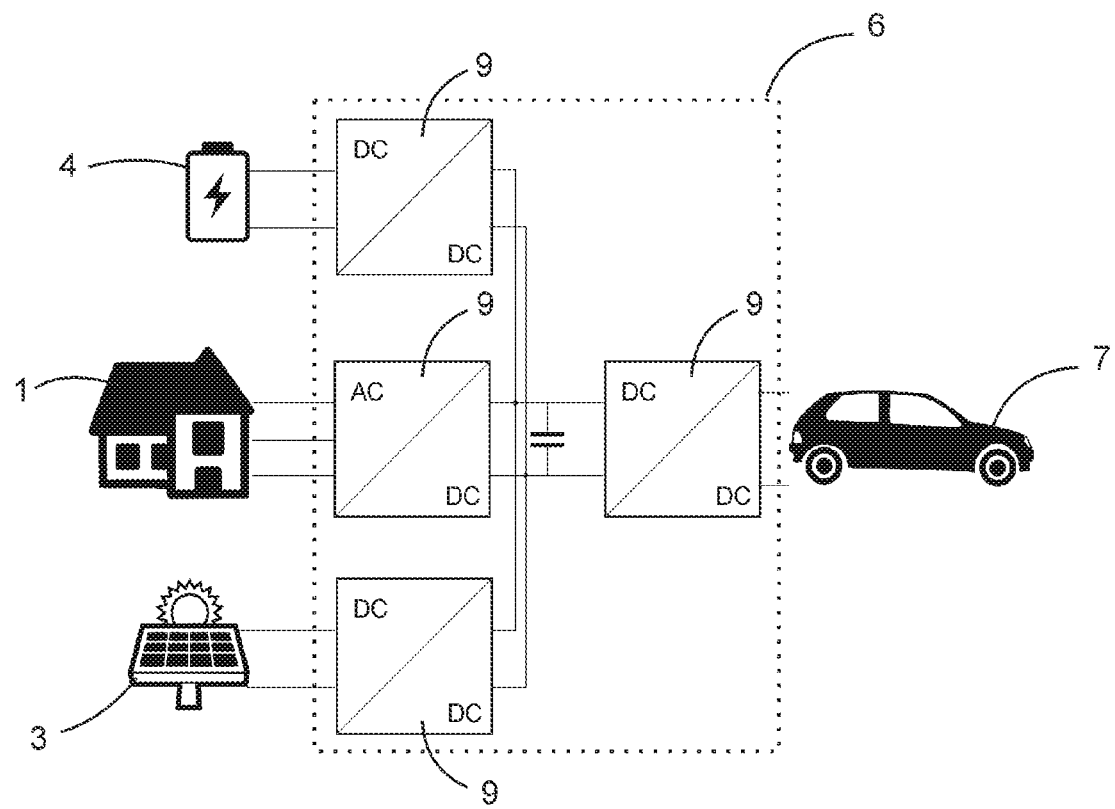
FIG. 3 illustrates a schematical embodiment of a charging station according to the present invention. It illustrates one possible embodiment for the internal power conversion topology using DC/DC conversion units connecting the additional power sources to the internal DC link of the EVCS.

In an embodiment, the at least one additional source of energy supplies to a local DC bus contained within the EVCS as illustrated in FIG. 3, using a DC/DC conversion stage 9. This allows to share in a simple and efficient way the power between all the sources as feeding/consuming power can be controlled effectively through the computing unit of the EVCS.

The EVCS 6 is preferably of the DC type and the EVCS preferably has a galvanic isolation.

As mentioned above, in some embodiments of the present invention the EVCS receives via the connectivity solution a value that indicates a power factor value to be reached. Since modern smart houses are prosumers, they can actively control power quality. Offering grid ancillary services allows to optimize costs and is another way of generating revenues than simply selling energy to the grid.

As discussed above, the additional sources of energy comprise, but are not limited to, photovoltaic panels, batteries, compressed air storage systems, fuel cells, wind turbine etc. Other equivalent sources may be envisaged. In addition, although the sources are represented close to each other in FIG. 2, this is in no way a limitation and a source may not be physically close to the house 1 or EVCS 6 but they may be placed at a distance. The computational and electronic means to process information may be also only local, i.e. in the network or elements of the network or at least a part of said means may not be local but in a "cloud", using decentralized means and/or distant servers, with hardware or wireless communication means for the transmission of data.

Also, FIG. 1 represents one house 1 in the network but this is only an example and there may be more than one house in said network. The house may be a single family house or the house may comprises several housings (such as a residential building) or another type of building. The same applies to the sources/producers and consumers: one only of each is illustrated but the network may comprises several (such as several solar panels 3 or several solar installations, several storages 4, several EVCS 6, several heat pumps 5, several electrical vehicles 7 etc.).

In an embodiment of the present invention, an additional energy storage power source may be directly integrated within the EVCS 6 enclosure/case for a local supply and avoid energy losses.

As discussed above, the limit values (for example as defined above) received by the EVCS via the connectivity solution are, but not limited to, manual setting by end user, automatic setting depending on time of day stored in a lookup table as a non-limiting example. A combination of such settings is also envisaged in the frame of the present invention.

Also, the EVCS is additionally connected to a service providing dynamic energy prices to be used in the system to be able to carry out the desired evaluation and choices of strategies depending on the price of energy.

Preferably, it is the EVCS 6 that controls the power supplied to and drawn from the EV, considering the set conditions, and it is the EVCS controls the power supplied to and drawn from an at least one additional source of energy with energy storage capability.

Preferably, the EVCS 6 is set/programmed to control the power supplied to and drawn from the EV, optimising the energy purchase cost and sales benefit by dynamically adapting the power consumption from the grid 2 and/or its injection to the grid 2 depending on price of purchase and price of sale of grid energy. As detailed above, this adaptation may follow different rules which are set by the user.

An advantage of the proposed solutions according to the present invention is that the charging station 6 independently adjusts its power based on the actual production and consumption in the local network without any communication with other house devices and without interfering with their operation and it can easily adapt the local network to the conditions (need in energy, cost of energy etc.).

Figure 4:
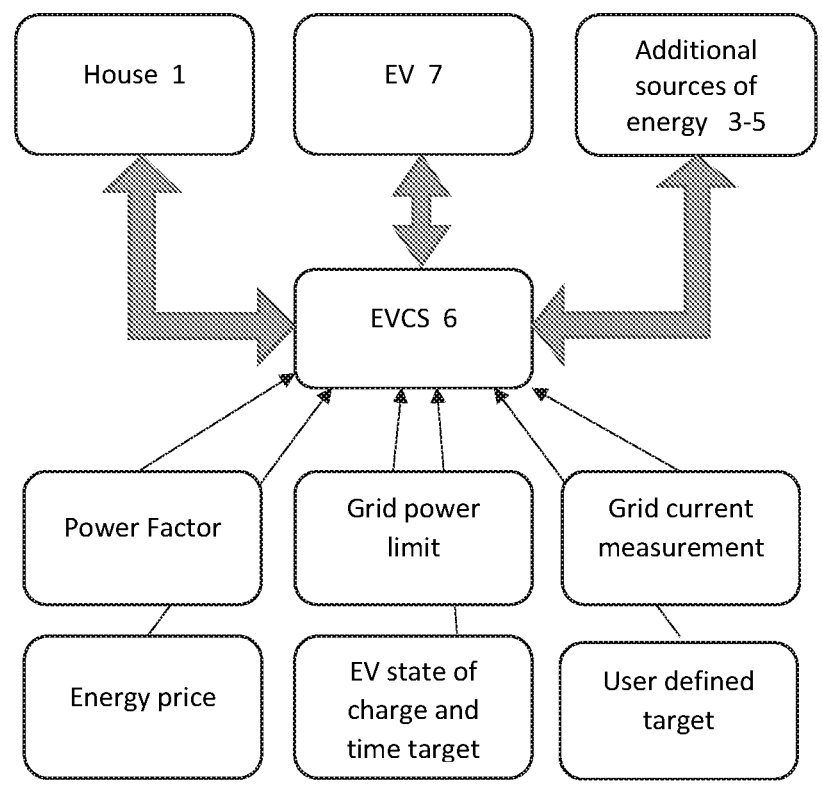
FIG. 4 illustrates a schematical block diagram illustrating method in embodiments of the present invention.

An example of the method according to embodiments of the present invention as described hereabove is schematically illustrated in FIG. 4, which shows the input of information/parameters in the ECVS 6 (e.g. power factors, energy prices, limits, measured values, state of charge, targets etc.) and the energy management for the consumers/producers (e.g. house 1, EV 7, additional sources of energy 3-5).

The present description is neither intended nor should it be construed as being representative of the full extent and scope of the present invention. The present invention is set forth in various levels of detail herein as well as in the attached drawings and in the detailed description of the invention and no limitation as to the scope of the present invention is intended by either the inclusion or non inclusion of elements, components, etc. Additional aspects of the present invention have become more readily apparent from the detailed description, particularly when taken together with the drawings.

Moreover, exemplary embodiments have been described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined not solely by the claims. The features illustrated or described in connection with an exemplary embodiment may be combined with the features of other embodiments. Such modifications and variations are intended to be included within the scope of the present invention. A number of problems with conventional methods and systems are noted herein and the methods and systems disclosed herein may address one or more of these problems. By describing these problems, no admission as to their knowledge in the art is intended. A person having ordinary skill in the art will appreciate that, although certain methods and systems are described herein with respect to embodiments of the present invention, the scope of the present invention is not so limited. Moreover, while this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. An electric vehicle charging station for an electric vehicle in a network comprising at least a house, an energy producer and an energy consumer, the station comprising:
    a first power connection interconnecting the station to a power grid of the house;
    a first power converter configured to supply power to and draw power from the electric vehicle;
    a data processing device configured to process information;
    a communication interface configured to send and to receive data from a user and/or a server; and
    a second power connection for interconnecting an additional source of energy to the station,
    wherein the station is directly connected to said energy producer and consumer
    wherein the station is configured to receive information on a power provided by the first power connection from a power metering device of the power grid,
    wherein the station is configured to receive, via the communication interface, a value indicative of a maximum allowed power that can be consumed from the power grid through the main power inlet of the house, and
    wherein the data processing device is configured to control a power supplied to and drawn from the electric vehicle, taking into account a power from the additional source of energy, to prevent exceeding a limits of power consumption from the network and injection in the network.

2. The station according to claim 1, wherein the station is configured to receive, via the communication interface, a value indicative of a maximum allowed power injected to the power grid through the main power inlet of the house.

3. The station according to claim 1, further comprising:
    a second power converter for converting power from the additional source of energy to a power used in the electric vehicle.

4. The station according to claim 1, further comprising:
    a third power converter for converting power from the additional source of energy to a power used in in the house.

5. The station according to claim 1, wherein the first power converter includes a switched power supply having actively switched devices.

6. The station according to claim 5, wherein the actively switched devices include at least one of IGBTs, MOSFETs, Si, SiC, and/or GaN devices.

7. The station according to claim 1, further comprising:
    a local DC bus,
    wherein the additional source of energy is configured to supply power to the local DC bus.

8. The station according to claim 1, further comprising:
    a galvanic isolation.

9. The station according to claim 1, wherein the station is configured to receive, via the communication interface, a value indicative of a power factor value to be reached.

10. The station according to claim 1, wherein the additional source of energy include at least one of,
    a photovoltaic panel,
    a battery,
    a compressed air storage system, and/or
    a fuel cell,
    wherein the station is configured to control a power supplied to and drawn from the additional source of energy.

11. The station according to claim 1, wherein the additional energy storage power source is integrated within an enclosure of the station.

12. The station according to claim 1, wherein the value indicative of the maximum allowed power is defined by a manual setting by the user or by an automatic setting.

13. The station according to claim 1, wherein the station is configured to be connected to a service that provides dynamic energy prices.

14. The station according to claim 1, wherein the station is configured to control the power supplied to and drawn from the electric vehicle, based on a maximum price of purchase of energy from the power grid and a minimum price of sales of energy to the power grid.

15. The station according to claim 1, wherein the station is configured to control the power supplied to and drawn from the electric vehicle, optimizing an energy purchase cost and sales benefit by dynamically adapting power consumption from and injection to the power grid depending on a price of purchase and a price of sale of grid energy.

16. A power management system comprising:
   a house;
   a plurality of energy producers;
   a plurality of energy consumers; and
   an electric vehicle charging station as defined in claim 1.

17. A method for managing a power network including at least a house, an energy producer, and an energy consumer, using an electric vehicle charging station an electric vehicle, the electric vehicle charging station including:
   a first power connection interconnecting the station to a power grid of the house, a first power converter configured to supply power to and draw power from the electric vehicle, a data processing device configured to process information, a communication interface configured to send and to receive data from a user and/or a server, and a second power connection for interconnecting an additional source of energy to the station, wherein the station is directly connected to said energy producer and consumer, the station being configured to receive information on a power provided by the first power connection from a power metering device of the power grid,
   the method comprising the steps of:
   receiving, via the communication interface, a value indicative of a maximum allowed power that can be consumed from the power grid through the main power inlet of the house, and
   controlling a power supplied to and drawn from the electric vehicle, taking into account a power from the additional source of energy, to prevent exceeding a limit of power consumption from the network and injection in the network.

18. The method according to claim 17, further comprising a step of:
   receiving, via the communication interface, a value indicative of a maximum allowed power injected to the power grid of the house through the main power inlet of the house.

19. The method according to claim 17, further comprising a step of:
   converting power from the additional source of energy to a power used in the electric vehicle.

20. The method according to claim 17, further comprising a step of:
   converting power from the additional source of energy to a power used in the house.

21. The method according to claim 17, further comprising a step of:
   receiving, via the communication interface, a value indicative of a power factor that is to be reached.

22. The method according to claim 18, wherein the value indicative of the maximum allowed power is defined by a manual setting by a user or by an automatic setting.

23. The method according to claim 17, further comprising a step of:
   receiving, via the communication interface, dynamic energy prices from an energy service provider; and
   controlling the power supplied to and drawn from the electric vehicle, considering a maximum price of purchase of energy from the power grid and a minimum price of sales of energy to the power grid.

24. The method according to claim 17, further comprising a step of:
   controlling the power supplied to and drawn from the electric vehicle by optimizing energy purchase cost and energy sales benefit by dynamically adapting power consumption from and injection to the power grid depending on price of purchase and price of sale of grid energy.

* * * * *